United States Patent
Hall et al.

(10) Patent No.: US 11,170,429 B1
(45) Date of Patent: Nov. 9, 2021

(54) METHODS AND SYSTEMS FOR PROVIDING NUTRITIONAL RECOMMENDATIONS

(71) Applicant: The Kroger Co., Cincinnati, OH (US)

(72) Inventors: Richard J. Hall, Cincinnati, OH (US); Lori J. Lovell, Cincinnati, OH (US); Sara R. Cunningham, Cincinnati, OH (US); Joseph M. G. Keller, Cincinnati, OH (US); Lauren A. Washington, Cincinnati, OH (US); Benjamin G. Marston, Cincinnati, OH (US); Lauren K. Fariello, Cincinnati, OH (US); Allison Baker, Cincinnati, OH (US)

(73) Assignee: THE KROGER CO., Cincinnati, OH (US)

( * ) Notice: Subject to any disclaimer, the term of this patent is extended or adjusted under 35 U.S.C. 154(b) by 142 days.

(21) Appl. No.: 16/353,394

(22) Filed: Mar. 14, 2019

(51) Int. Cl.
*G06Q 30/00* (2012.01)
*G06Q 30/06* (2012.01)
*G09B 19/00* (2006.01)

(52) U.S. Cl.
CPC ..... *G06Q 30/0631* (2013.01); *G06Q 30/0627* (2013.01); *G09B 19/0092* (2013.01)

(58) Field of Classification Search
None
See application file for complete search history.

(56) References Cited

U.S. PATENT DOCUMENTS

| | | | |
|---|---|---|---|
| 7,974,881 B2* | 7/2011 | Culver | G16H 20/60 705/15 |
| 2003/0208409 A1* | 11/2003 | Mault | G06F 19/3475 705/15 |
| 2005/0049920 A1* | 3/2005 | Day | G06Q 50/12 705/15 |
| 2008/0091705 A1* | 4/2008 | McBride | G09B 19/0092 |

(Continued)

OTHER PUBLICATIONS

Dr Yau Teng Yan "Food Score: Nutrient Profiling Based Meal Scoring" Retrieved from https://www.holmusk.com/assets/whitepapers/Holmusk_Food_Score_02.pdf on Feb. 23, 2021 (Year: 2021).*

(Continued)

*Primary Examiner* — Naeem U Haq
(74) *Attorney, Agent, or Firm* — Stites & Harbison, PLLC; Terry L. Wright; James R. Hayne

(57) ABSTRACT

Systems and methods for providing nutritional recommendations to a registered customer of a business make use of a central computer server and a database including nutritional scores associated with products offered by the business. The central computer server receives a list of products purchased by the customer from the business, and processes that list to assign a nutritional score from the database to each of the products purchased by the customer. The nutritional score of each of the products purchased by the customer is then compared with a nutritional score of one or more product alternatives such that, based on that comparison, a recommended product alternative is selected having a nutritional score higher than a corresponding one of the products purchased by the registered customer. The recom- (Continued)

mended product alternative is then transmitted to the customer via a software application running on a mobile device of the registered customer.

17 Claims, 4 Drawing Sheets

(56) References Cited

U.S. PATENT DOCUMENTS

| | | | |
|---|---|---|---|
| 2013/0151357 A1* | 6/2013 | Havas | G06Q 50/12 705/15 |
| 2014/0214590 A1* | 7/2014 | Argue | G06Q 30/0631 705/26.7 |
| 2014/0304105 A1* | 10/2014 | Zamer | G06Q 30/0631 705/26.7 |
| 2015/0269645 A1* | 9/2015 | Gibson | G06Q 50/12 705/26.7 |
| 2017/0046980 A1* | 2/2017 | Mehta | A23L 33/30 |
| 2018/0233223 A1* | 8/2018 | Solari | G16H 50/30 |
| 2019/0252058 A1* | 8/2019 | Wolf | G16H 50/70 |

OTHER PUBLICATIONS

Fooducate LTD, downloaded Jan. 22, 2021. https://www.fooducate.com/.

Shopwell, downloaded Jan. 22, 2021. https://www.innit.com/shopwell/.

NuVal, LLC, downloaded Jan. 22, 2021. http://www.nuval.com/.

\* cited by examiner

METHODS AND SYSTEMS FOR PROVIDING NUTRITIONAL RECOMMENDATIONS

TECHNICAL FIELD

The present invention relates to methods and systems for providing nutritional recommendations. In particular, the present invention relates to methods and systems for providing nutritional recommendations that integrate nutritional scores of products offered by a business with a registered customer's purchase history to provide a recommendation of an alternative product having a higher nutritional score than a corresponding product purchased by the registered customer.

BACKGROUND

Dietary tracking and related software applications are becoming increasingly popular as a means to monitor the nutritional value of the food products being ingested by individuals and to assist those individuals in making healthier food choices. For example, in certain software applications, an individual directly inputs the food products that were consumed for each meal into the software application, which, in turn, pulls certain nutritional information about the consumed food products, including the number and types of calories associated with the consumed food products, from a database. In this way, the individual can then keep track of the number of calories being consumed, as well as the amount of protein, fat, and carbohydrates in those food products, to thereby make healthier choices and maintain healthy eating habits. In other software applications, and as another example, an individual may use their smartphone to scan a packaged food product's bar code or to search for a food product. That smartphone application will then, based on data stored in an associated database, display a letter grade for that packaged food product to allow the individual to see if they are making a healthy food choice. In both instances, however, no recommendations of healthier choices are being made to the individual. Rather, in those applications, the individual is only provided with the nutritional data associated with the item that is directly inputted by the individual into the software application. Accordingly, a method and system that provides nutritional recommendations and that bases those nutritional recommendations on data that is not directly inputted by the individual into the software application would be both highly desirable and beneficial.

SUMMARY

The present invention relates to methods and systems for providing nutritional recommendations. In particular, the present invention relates to systems and methods for providing nutritional recommendations that integrate nutritional scores of products offered by a business with a registered customer's purchase history to provide a recommendation of an alternative product having a higher nutritional score than a corresponding product purchased by the registered customer.

In one exemplary implementation of a method and system for providing nutritional recommendations to a registered customer of a business, a customer initially registers as a customer of the business and is in communication with a central computer server and associated database. In registering, the customer typically provides customer identifying information, such as the customer's name, location, contact information, and the like, but also further includes other data specific to that customer's shopping preferences. The collected data about each of the registered customers is then stored in the database.

To register as a customer of the business, the customer typically installs a software application (or "app") on a mobile device that allows the registered customer to interact with the central computer server and the associated database. Such mobile devices include, but are not limited to, smartphones, tablets, or similar computing devices with a microprocessor, an internal memory component (e.g., a hard drive or solid-state drive), a display screen, and, in certain cases, a camera. Communications between the central computer server and the mobile device of a registered customer are generally facilitated through an internet connection, satellite communication, or other communications network or similar known means of data transport.

With respect to the database, the database initially receives and stores data about each of the registered customers, including the customer's login credentials, name, location, and/or contact information. The data associated with the registered customer also includes and is generally linked to a loyalty or rewards account associated with a particular registered customer, such that the database is further used to store, or can be linked to another database that collects and stores, point-of-purchase data associated with each of the registered customers each time a registered customer provides his or her loyalty or rewards account information at the time of a purchase.

In addition to storing data associated with each of the registered customers of a business, the database is further used to compile and store nutritional data or facts associated with the products offered by the business. In particular, in the context of grocery store products, such nutritional facts about the products include calories, numbers of servings, total fat including amounts of saturated and trans fats, amounts of cholesterol and sodium, total carbohydrates, including dietary fiber and sugar, amounts of proteins, ingredients, and other such characteristics of the products. Further to the storing of such common nutritional facts, the database is then also used to compile and store a nutritional score associated with each of the products offered by the business. In some implementations, such a nutritional score is calculated by making use of a nutrient profiling model in which points are awarded for positive and negative nutrients or factors within a particular product and in which the difference between those points are used to calculate a final product nutritional score.

In certain implementations of the methods and systems of the present invention, nutritional scores are calculated by first assigning point values to nutritional attributes associated with each particular product, including, but not limited to, nutritional attributes such as serving size, calories, protein, saturated fat, sugar, fiber, sodium, and the like. Among those nutritional scoring attributes, certain attributes are then selected as positive factors and a point value is then assigned to each factor in that predetermined group of positive factors, while other attributes are selected as negative factors and a point value is assigned to each factor in that predetermined group of negative factors. In some implementations, the point values associated with the positive factors can further include a bonus point value based on a particular attribute, while the point values associated with the negative factors can further include a penalty point value based on a particular attribute.

Upon assigning the point values to the positive and negative factors present in a particular product, and upon accounting for any bonus point values and penalty point values associated with a particular product, a raw nutritional score is then calculated based upon those assigned point values. Once the raw nutritional score for a particular one of the products is calculated, the raw nutritional score is then rescaled so as to obtain a nutritional score that is on a scale of 0 to 100, where a nutritional score of 0 is characterized as the least healthy and a nutritional score of 100 is characterized as the most healthy.

Subsequent to calculating the nutritional score for each of the products offered by the business and compiling those scores in the database, the central computer server then receives a list of one or more products purchased by the registered user either directly from the database or from another database that collects and stores such lists of purchased products as well as other purchase history associated with a loyalty or rewards account of each of the registered customers. Subsequent to receiving the list of the products purchased by the registered customer, and in response to a request from the mobile device of a registered customer via the software application running on the mobile device of the registered customer, the list of products is then processed by the central computer server to thereby assign a previously calculated nutritional score from the database to each of the products on the list of products purchased by the registered customer. Once those nutritional scores are assigned, the central computer server then compares the nutritional score of each of the products purchased by the registered customer with a nutritional score of one or more alternative products for each of the products purchased by the registered customer, where the alternative products recommended to the registered customer generally have a higher nutritional score than the corresponding one of the one or more products purchased by the registered customer. In this way, upon the transmission, via the central computer server, of one or more recommended alternative products to the mobile device of the registered customer, the registered customer can then "opt up" and make a healthier food choice by purchasing or otherwise selecting the recommended alternative product having a higher nutritional score.

In addition to providing a registered customer of a business a nutritional recommendation in the form of a recommended healthier alternative to a product previously purchased by the registered customer, the methods and systems of the present invention further provide the registered customer with a number of further metrics to assist the registered customer in making healthier nutritional choices. For example, in certain implementations, the central computer server transmits an overall nutritional score for a particular list of products purchased by the registered customer, so as to provide the registered customer with an indication of whether the registered customer is engaging in healthy shopping habits. As another example, in other implementations, the central computer server initiates an analysis of a nutritional score associated with a particular one of the products purchased by the registered customer in order to classify that product as either having a high nutritional score, a moderate nutritional score, or a low nutritional score. Once classified, that initial analysis can then be extended to the remaining products on a particular list of products purchased by the user, such that the central computer server initiates and subsequently provides an analysis of an amount of the products on the list that have a high nutritional score, a moderate nutritional score, and a low nutritional score. That analysis is then transmitted to the registered customer and provides the customer with a display of the percentage of products from the registered customer's list of purchased products having a high nutritional score, a moderate nutritional score, or a low nutritional score.

To further assist the registered customer in selecting heathier options, in some implementations, the database further collects data associated with dietary preferences of the registered customer. In selecting a recommend alternative product or products for the registered customer, the central computer server can then base the recommended alternative products, at least in part, on the dietary preferences inputted by the registered customer and cause those dietary preferences to be displayed in the form of dietary tags on the software application running on the mobile device of the registered customer along with the nutritional score of the product and nutritional facts associated with the product. If the customer chooses such a healthier option, in some implementations, the registered customer can then add, via the central computer server, the recommended product alternative to a future purchase list of the registered customer by selecting (e.g., by hitting "Send to Cart") the recommended product alternative on the software application running on the mobile device of the registered customer.

Further features and advantages of the present invention will become evident to those of ordinary skill in the art after a study of the description, figures, and non-limiting examples in this document.

DESCRIPTION OF EXEMPLARY EMBODIMENTS

The present invention relates to methods and systems for providing nutritional recommendations. In particular, the present invention relates to methods and systems for providing nutritional recommendations that integrate nutritional scores of products offered by a business with a registered customer's purchase history to provide a recommendation of an alternative product having a higher nutritional score than a corresponding product purchased by the registered customer.

Figure 1:
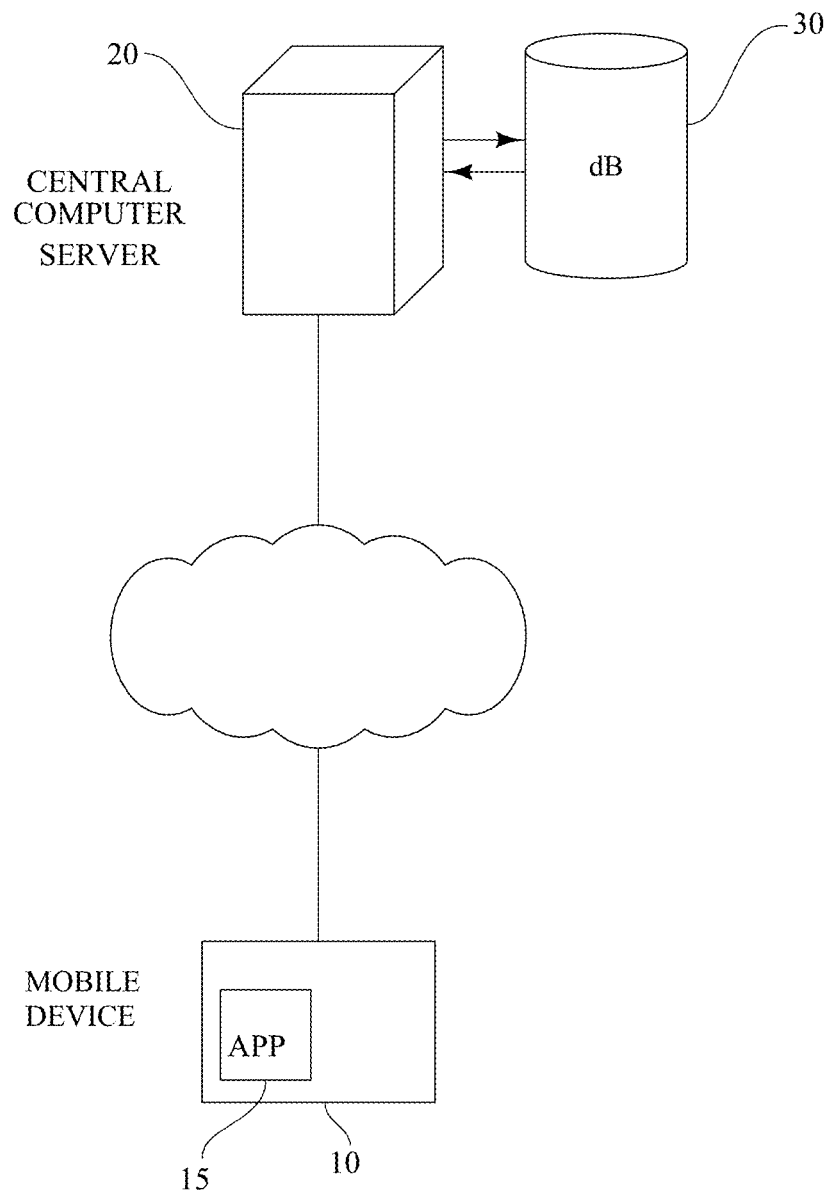
FIG. 1 is a schematic diagram showing an exemplary system for providing nutritional recommendations to a registered customer of a business in accordance with the present invention.

Referring first to FIG. 1, in one exemplary implementation of a method and system for providing nutritional recommendations to a registered customer of a business, a customer initially registers as a customer of the business and is in communication with a central computer server 20 and associated database 30. In registering, the customer typically provides customer identifying information, such as the customer's name, location, contact information, and the like, but also further includes other data specific to that customer's shopping and other preferences, as described in further detail below. The collected data about each of the registered customers is then stored in the database 30.

As shown in FIG. 1, to register as a customer of the business, the customer typically installs a software application (or "app") 15 on a mobile device 10 that allows the registered customer to interact with the central computer server 20 and the associated database 30. Such mobile devices 10 include, but are not limited to, smartphones, tablets, or similar computing devices with a microprocessor, an internal memory component (e.g., a hard drive or solid-state drive), a display screen, and, in certain cases, a camera. Communications between the central computer server 20 and the mobile device 10 of a registered customer are generally facilitated through an internet connection, satellite communication, or other communications network or similar known means of data transport. Of course, in some implementations, it is also contemplated that at least some registered customers could also be in communication with the central computer server 20 and associated database 30 via a desktop or personal computer with a software component that communicates with the central computer server 20, such as via a web-based application accessible through a common internet browser.

With respect to the database 30 included and utilized in the exemplary systems and methods for providing personalized information shown in FIG. 1, and as described above, the database 30 initially receives and stores data about each of the registered customers, including the customer's login credentials, name, location, and/or contact information. The data associated with the registered customer also includes and is generally linked to a loyalty or rewards account associated with a particular registered customer. In this regard, the database 30 is further used to store, or can be linked to another database that collects and stores, point-of-purchase data associated with each of the registered customers each time a registered customer provides his or her loyalty or rewards account information at the time of a purchase. As a result, the database 30 includes personal customer-inputted data (e.g., name, location, preferences, etc.), but further includes and/or makes use of additional collected data including, but not limited to, purchase history, the frequency at which a particular product is purchased, the amount of a particular product purchased, and the like.

In addition to storing data associated with each of the registered customers of a business, the database 30 is further used to compile and store nutritional data or facts associated with the products offered by the business. In particular, in the context of grocery store products, such nutritional facts about the products include calories, numbers of servings, total fat including amounts of saturated and trans fats, amounts of cholesterol and sodium, total carbohydrates, including dietary fiber and sugar, amounts of proteins, ingredients, and other such characteristics of the products. In addition to the storing of such common nutritional facts, however, the database 30 is further used to compile and store a nutritional score associated with each of the products offered by the business. In some implementations, such a nutritional score is calculated by making use of a nutrient profiling model in which points are awarded for positive and negative nutrients or factors within a particular product and in which the difference between those points are used to calculate a final product nutrition score.

For example, in certain implementations of the methods and systems of the present invention, nutritional scores are calculated by first assigning point values to nutritional attributes associated with each particular product, including, but not limited to nutritional attributes such as serving size, calories, protein, saturated fat, sugar, fiber, sodium, and the like. Among those nutritional scoring attributes, certain attributes are then selected as positive or "good" factors and a point value is then assigned to each factor in that predetermined group of positive factors, while other attributes are selected as negative or "bad" factors and a point value is assigned to each factor in that predetermined group of negative factors. For instance, in some implementations, fruit, nut, vegetable, and whole grain content are designated as a positive factor along with protein content and fiber content. The fruit, nut, vegetable, and whole grain content of each particular product is then assigned a point value of 0 to 10, the protein content of each particular product is assigned a point value of 0 to 5, and the fiber content of each particular product is assigned a point value of 0 to 5. Calories, saturated fat, sodium, and sugar are then designated as negative factors, with the calories associated with each particular product being assigned a point value of 0 to 10, the saturated fat content of each particular product being assigned a value of 0 to 10, the sodium content of each particular product being assigned a value of 0 to 10, and the natural sugar content of each particular product being assigned a value of 0 to 10. In some implementations, and in addition to assigning a point value to positive and negative factors for each particular product based on the above scoring attributes, the positive factors and, more particularly, the point values associated with the positive factors can further include a bonus point value (e.g., 0 to 5) that is based on an amount of healthy fat (e.g., omega-3 fat) in a particular one of the products. In other implementations, the negative factors and, more particularly, the point values associated with the negative factors further include a penalty point value corresponding to an amount of added sugar in a particular one of the products.

To assign a point value to a particular product, in some implementations of the present invention, the point values associated with the negative factors and the point values associated with the positive factors associated with a particular product are assigned by first adjusting the nutrition profile to a 100 g basis for the product or a 240 ml basis if the product is a beverage. In other words, in such implementations, the points assigned to the negative factors are based on the amount of calories, saturated fat, sodium, and sugar present in 100 g of the product (or 240 ml of the beverage product), while the points assigned to the positive factors are based on the fruit, nut vegetable, and whole grain content in 100 g of product (240 ml of beverage product) along with protein content and fiber content present in such amounts of product. Once the negative and positive factors are scaled to the 100 g (or 240 ml) basis, the point values can the readily be assigned based on a sliding scale whereby the amounts of negative or positive factors correspond to a higher or lower scores. In some implementations, such assigning of point values can also be done on a per serving basis as desired.

Upon assigning the point values to the positive and negative factors present in a particular product, and upon accounting for any bonus point values and penalty point values associated with a particular product, a raw nutritional score is then calculated based upon those assigned point values. In some implementations, the raw nutritional score can be calculated by adding the penalty point value to the total point value of the negative factors and then subtracting the bonus point value associated with that particular product. In some implementations, however, and, in particular, when the total of the negative factors are below a predetermined value (e.g., less than 11), the fruit, vegetable, nut, and whole grain content is greater than a predetermined value (e.g., greater than 5), and the protein content is greater than a predetermined value (e.g., greater than 1), calculating the raw score further comprises subtracting the total point value of the positive factors from that of the negative factors and then adding the penalty point value and subtracting the bonus point value associated with that particular product to obtain a raw nutritional score. In other words, in some implementations, the nutritional score can be calculated using the following equations:

nutritional score is then rescaled so as to obtain a nutritional score that is on a scale of 0 to 100, where a nutritional score of 0 is characterized as the least healthy and a nutritional score of 100 is characterized as the most healthy. In some implementations, calculating a nutritional score using the above-described procedures for calculating a raw nutritional score is performed by making use of the following equation: Nutritional Score=100×((35−Raw Score)/50).

As one example of calculating a raw nutritional score and a nutritional score on a scale of 1-100, Table 1 below provides scoring associated with an exemplary cereal product having the quantity of positive ("good") and negative ("bad") factors as indicated. In the exemplary cereal shown in Table 1, the cereal is not provided with an added bonus point value or a subtracted penalty value, so the 100 g raw score is calculated by subtracting the negative factor points from the positive factor points as follows: (calories+sat_fat+sodium+sugar)−(fiber)=(4+2+7+0)−5=13−5=raw score=8. The overall nutritional score for the product of Table 1 is then 100*(35−SCORE)/50=54.

TABLE 1

Cereal Nutritional Points.

| | UPC | NUTRIENT | POINT_TYPE | QUANTITY | SERVING_SIZE | CT | NUT_POINTS_SERVING | NUT_POINTS_100 G |
|---|---|---|---|---|---|---|---|---|
| 1 | 0001600048772 | fruit_veg_nut_wg | good | 0 | 28 | 3 | 0 | 0 |
| 2 | 0001600048772 | sat_fat | bad | 0.5 | 28 | 121 | 1 | 2 |
| 3 | 0001600048772 | fiber | good | 5 | 28 | 30 | 1 | 5 |
| 4 | 0001600048772 | protein | good | 3 | 28 | 36 | 1 | 5 |
| 5 | 0001600048772 | sodium | bad | 140 | 28 | 121 | 2 | 7 |
| 6 | 0001600048772 | calories | bad | 100 | 28 | 121 | 1 | 4 |
| 7 | 0001600048772 | sugar | bad | 1 | 28 | 121 | 0 | 0 |

If: negative factor points are less than <11
Fruit/vegetable/nut/whole grain content >5
Or protein content is greater than or equal to 1
Then:
Raw Score=negative factor points−positive factor points+Penalty points−Bonus points Otherwise:
Raw Score=negative factor points+Penalty points−Bonus points
For further information and guidance with respect to the assigning of point values to food attributes and the calculation of nutritional scores, see, e.g., United Kingdom Food Standards Agency, Nutrient Profiling Model, published by the Government of the United Kingdom, Department of Health and Social Care, and available online at (https://www.gov.uk/government/publications/the-nutrient-profiling-model).

Regardless of the particular calculation for determining the raw nutritional score, once the raw nutritional score for a particular one of the products is calculated, the raw As another example of calculating a raw nutritional score and a nutritional score on a scale of 1-100, Table 2 below provides scoring associated with an exemplary macaroni and cheese product having the quantity of positive ("good") and negative ("bad") factors as indicated. In the exemplary macaroni and cheese product shown in Table 2, the macaroni and cheese is not provided with an added bonus point value or a subtracted penalty value, so the 100 g raw score is calculated by subtracting the negative factor points from the positive factor points as follows: (calories+sat_fat+sodium+sugar)−(fiber)=(4+3+8+1)−0=16−0=16. The overall nutritional score for the product of Table 2 is then 100*(35−SCORE)/50=38.

TABLE 2

Macaroni and Cheese Nutritional Points.

| | UPC | NUTRIENT | POINT_TYPE | QUANTITY | SERVING_SIZE | CT | NUT_POINTS_SERVING | NUT_POINTS_100 G |
|---|---|---|---|---|---|---|---|---|
| 1 | 0001356230011 | calories | bad | 270 | 71 | 121 | 3 | 4 |
| 2 | 0001356230011 | sugar | bad | 5 | 71 | 121 | 1 | 1 |
| 3 | 0001356230011 | protein | good | 10 | 71 | 36 | 5 | 5 |
| 4 | 0001356230011 | fiber | good | 2 | 71 | 30 | 0 | 0 |
| 5 | 0001356230011 | fruit_veg_nut_wg | good | 0 | 71 | 3 | 0 | 0 |
| 6 | 0001356230011 | sat_fat | bad | 2 | 71 | 121 | 3 | 3 |
| 7 | 0001356230011 | sodium | bad | 400 | 71 | 121 | 5 | 5 |

Referring still generally to FIG. 1, once the nutritional score for each of the products offered by the business have been compiled in the database 30, the central computer server 20 then receives a list of one or more products purchased by the registered user either directly from the database 30 or from another database that collects and stores such lists of purchased products as well as other purchase history associated with a loyalty or rewards account of each of the registered customers. Upon receiving the list of the products purchased by the registered customer, and in response to a request from the mobile device 10 of a registered customer via a software application 15 running on the mobile device 10 of the registered customer, the list of products is then processed by the central computer server 15 to thereby assign a previously calculated nutritional score from the database 30 to each of the products on the list of products purchased by the registered customer. Once those nutritional scores are assigned, the central computer server 20 then compares the nutritional score of each of the products purchased by the registered customer with a nutritional score of one or more alternative products for each of the products purchased by the registered customer. In this regard, such product alternatives for the products purchased by the registered customer are selected, in some implementations, based on a substitution model that identifies substitutable products based on customer purchase behavior. In such implementations, the substitution model factors in purchase transaction data and product nutrition ratings to determine alternative products that are most similar to one another. In this way, for a given a product, the substitution model first identifies other products that are typically purchased by customers at the same time or instead of the product in question, such that the substitutable products have some degree of interchangeability from a customer purchase preference perspective. Those substitutable products are then ranked from most commonly interchangeable to least commonly interchangeable. That ranked list of substitutable products is then filtered to only contain products with a higher nutritional score, and then the list is then re-ranked using a weighted average of the product's nutritional score and substitutability to the original product. For example, assuming a given customer always buys cereal brand A during a shopping trip, but may vary the brand to cereal X, Y, or Z in certain trips. In the above-described implementations, cereals X, Y, and Z are all substitutable products for cereal A and are ranked in order of the frequency in which the customer purchases them as a replacement. Such a set of cereals is then filtered to only contain the options with a higher nutritional score than cereal A. The set of "healthier" or higher-scoring cereals is then re-ranked using the weighted average of substitutability and nutrition score associated with each product to provide one or more recommended alternative products.

With further respect to the selection of alternative products for the products purchased by the consumer, to assist the registered customer in making healthier selections, the alternative products recommended to the registered customer generally have a higher nutritional score than the corresponding one of the one or more products purchased by the registered customer. In this way, upon the transmission, via the central computer server 20, of one or more recommended alternative products selected from the identified alternative products to the mobile device 10 of the registered customer via the software application 15 running on the mobile device, the registered customer can "opt up" and make a healthier food choice by purchasing the recommended alternative product having a higher nutritional score.

Figure 2:
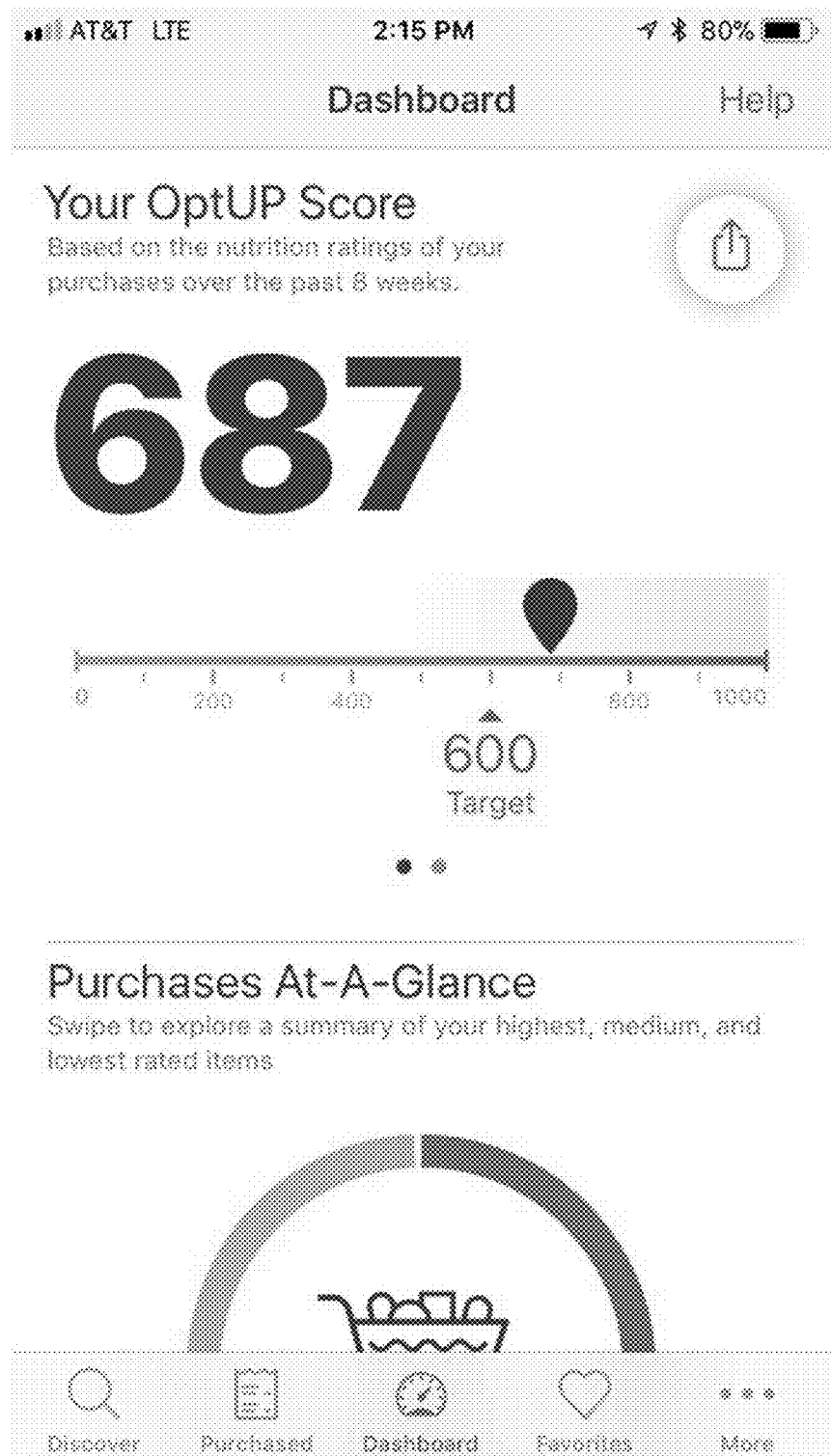
FIG. 2 is a screenshot of a smartphone application showing an exemplary implementation of a method for providing nutritional recommendations to a registered customer of a business in accordance with the present invention and showing an overall nutritional score for a list of products purchased by the registered customer.

In addition to providing a registered customer of a business a nutritional recommendation in the form of a recommended alternative to a product previously purchased by the registered customer, the methods and systems of the present invention further provide the registered customer with a number of further metrics to assist the registered customer in making healthier nutritional choices. For example, in certain implementations and in response to a request from the mobile device 10 of a registered customer via the software application 15 running on the mobile device 10, the central computer server 20 transmits an overall nutritional score for a particular list of products purchased by the registered customer, as perhaps shown best in FIG. 2, so as to provide the registered customer with an indication of whether the registered customer is engaging in healthy shopping habits. In some implementations, the overall nutritional score is calculated by multiplying 10 times the weighted average of the product nutrition rating for the products purchased where the weights are determined by the number of units purchased, as shown in the following equation:

User score=10*(SUM([Number of Units Purchased]*[Nutrition Rating])/SUM(Number of Units purchased))

Figure 3:
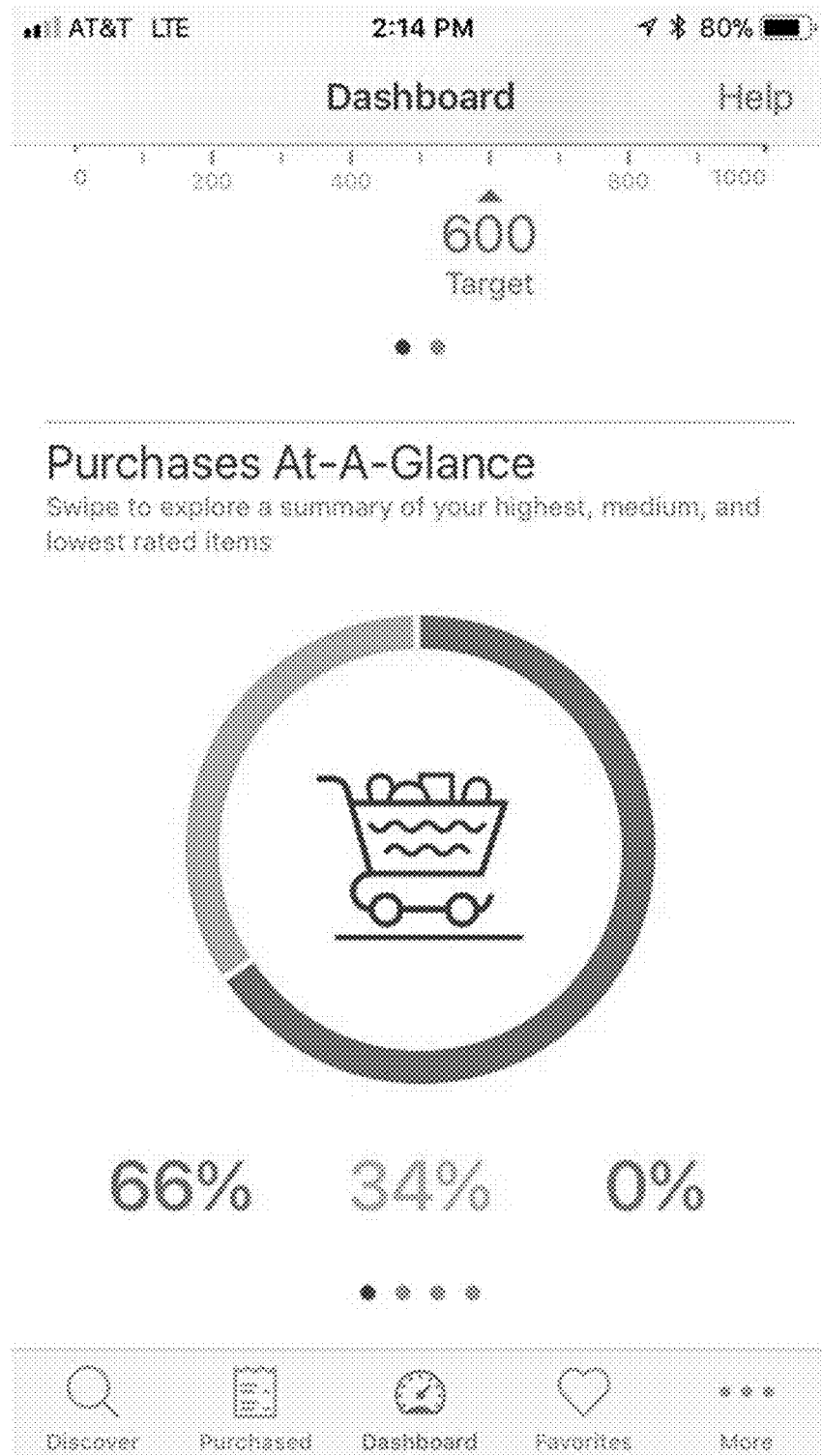
FIG. 3 is another screenshot of a smartphone application showing an exemplary implementation of a method for providing nutritional recommendations to a registered customer of a business in accordance with the present invention and showing percentages of products having a high nutritional score, a moderate nutritional score, and a low nutritional score from a registered customer's list of purchase products.

As another example, in other implementations, the central computer server 20 initiates an analysis of a nutritional score associated with a particular one of the products purchased by the registered customer in order to classify that product as either having a high nutritional score (e.g., a rescaled nutritional score of between 71 and 100), a moderate nutritional score (e.g., a rescaled nutritional score of between 36 and 70), or a low nutritional score (e.g., a rescaled nutritional score of between 1 and 35). Once classified, that initial analysis can then be extended to the remaining products on a particular list of products purchased by the user, such that the central computer server 20 initiates and subsequently provides an analysis of an amount of the products having a high nutritional score, an amount of the products having a moderate nutritional score, and an amount of the products having a low nutritional score. That analysis is then transmitted to the registered customer, via the software application running on the mobile device, and provides the customer with a display of the percentage of products from the registered customer's list of purchased products having high nutritional score, a moderate nutritional score, or a low nutritional score, as shown best in FIG. 3.

Figure 4:
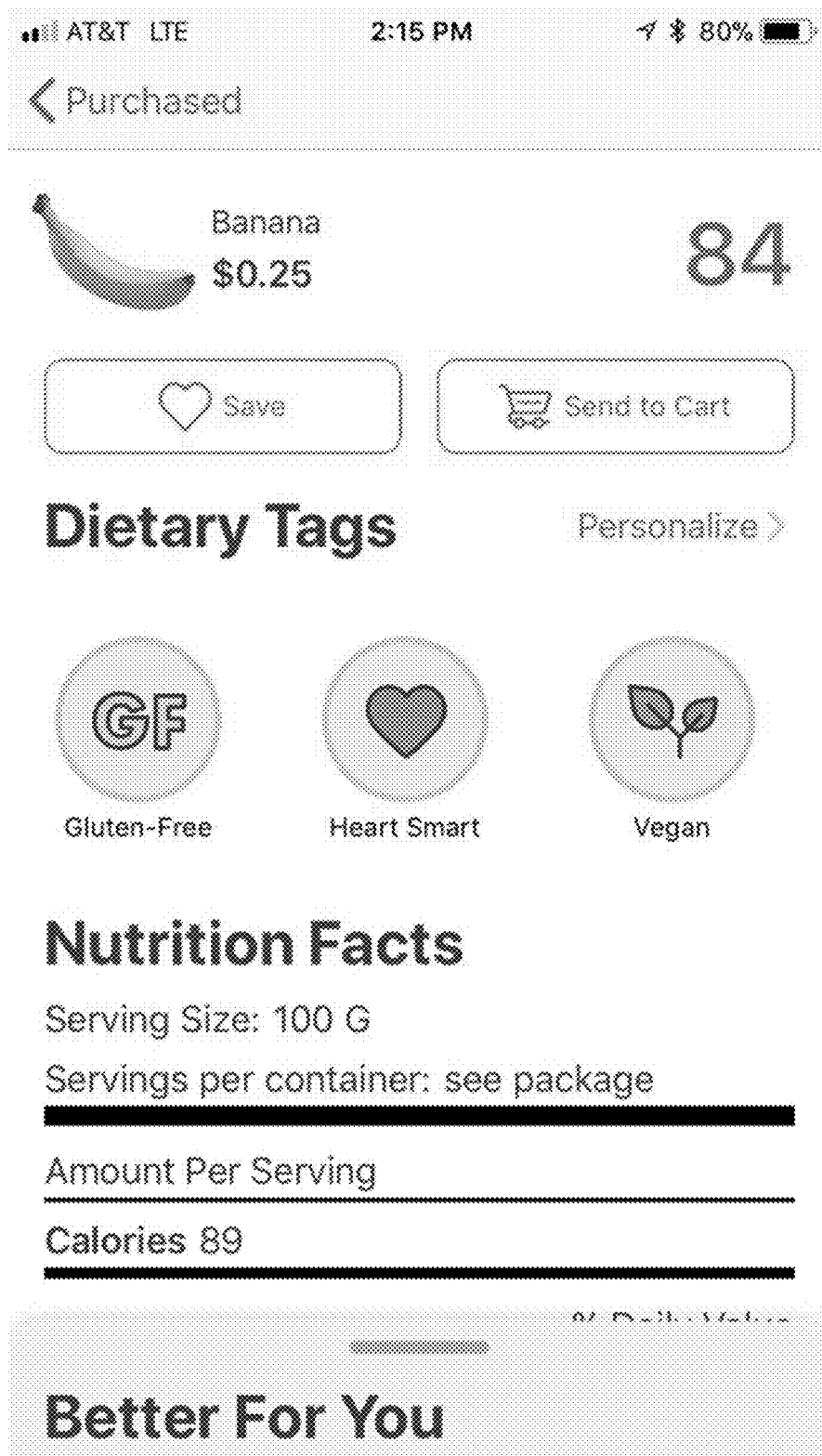
FIG. 4 is another screenshot of a smartphone application showing an exemplary implementation of a method for providing nutritional recommendations to a registered customer of a business in accordance with the present invention and showing a recommended alternative product with its associated nutritional score, dietary tags, and nutritional facts.

To further assist the registered customer in selecting heathier options, in some implementations, the database 30 further collects data associated with dietary preferences of the registered customer, such as, in the context of grocery shopping and food products, data related to artificial colors or flavors present in a food product, artificial sweeteners present in a food product, dairy present in a food product, gluten-free food products, heart smart food products, high protein food products, immune boosting food products, products that are keto-diet friendly, vegan food products, and the like. In selecting a recommend alternative product or products for the registered customer, the central computer server 20 bases the recommended alternative products, at least in part, on the dietary preferences inputted by the registered customer via the software application 15 running on the mobile device 10 and then stored in the database 30. In some implementations, in providing a recommended alternative product, via the central computer server 20, the central computer server 20 causes those dietary preferences to be displayed in the form of dietary tags on the software application 15 running on the mobile device 10 of registered customer along with the nutritional score of the product and nutritional facts associated with the product, as perhaps best shown in FIG. 4. In some implementations, and as also shown in FIG. 4, the registered customer can then add, via the central computer server, the recommended product alternative to a future purchase list of the registered customer by selecting (e.g., by hitting "Send to Cart") the recommended product alternative via the software application 15 running on the mobile device 10 of the registered customer.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A method for providing nutritional recommendations to a registered customer of a business, comprising:
    compiling a database including nutritional scores associated with products offered by a business, the database managed by a central computer server;
    receiving, at the central computer server, a list of one or more products purchased by the registered customer;
    processing, via the central computer server, the list of one or more products purchased by the registered customer to assign a nutritional score from the database to each of the one or more products purchased by the registered customer;
    comparing the nutritional score of each of the one or more products purchased by the registered customer with a nutritional score of one or more alternative products for each of the one or more products purchased by the registered customer; and
    transmitting, via the central computer server, a recommended alternative product selected from the one or more alternative products to a mobile device associated with the registered customer via a software application running on the mobile device, the recommended alternative product having a nutritional score higher than the nutritional score of a corresponding one of the one or more products purchased by the registered customer, and the recommended alternative product alternative based on a purchase history of the registered customer stored in the database;
    displaying on the mobile device, the recommended alternative product alongside an indicator to purchase the recommended alternative product;
    adding, via the central computer server, the recommended alternative product to a future purchase list of the registered customer in response to a selection of the indicator to purchase the recommended alternative product via the software application running on the mobile device of the registered customer,
    wherein the nutritional scores associated with the products offered by the business are calculated by assigning a point value to a predetermined group of positive factors associated with a particular one of the products offered by the business and by assigning a point value to a predetermined group of negative factors associated with the particular one of the products offered by the business,
    wherein the positive factors are selected from the group consisting of: fruit, vegetable, nut, and whole grain content; protein content; and fiber content,
    wherein the negative factors are selected from the group consisting of: number of calories; amount of saturated fat; sodium content; and natural sugar content,
    wherein the positive factors further include a bonus point value corresponding to an amount of healthy fat in the particular one of the products offered by the business, and
    wherein the negative factors further include a penalty point value corresponding to an amount of added sugar in the particular one of the products offered by the business.

2. The method of claim 1, further comprising a step of, prior to receiving the list of one or more products purchased by a registered customer, compiling a database including data associated with the registered customer of the business.

3. The method of claim 2, wherein the data associated with the registered customer of the business includes dietary preferences, and wherein the recommended product alternative is based, in part, on the dietary preferences of the registered customer.

4. The method of claim 1, wherein processing the list of one or more products purchased by the registered customer is initiated in response to a request from the mobile device of a registered customer via the software application running on the mobile device.

5. The method of claim 4, wherein the recommended alternative product is transmitted from the central computer server to the mobile device of the customer via the software application running on the mobile device.

6. The method of claim 1, wherein the mobile device is a smart phone.

7. The method of claim 1, wherein the nutritional scores associated with the products offered by the business are calculated with scoring attributes selected from the group consisting of serving size, calories, protein, saturated fat, sugar, fiber, and sodium.

8. The method of claim 1, further comprising calculating a raw nutritional score for the particular one of the products offered by the business, the raw nutritional score calculated by adding the penalty point value to the point value of the negative factors and then subtracting the bonus point value.

9. The method of claim 8, wherein when the point value of the negative factors is below a predetermined value, the fruit, vegetable, nut, and whole grain content is greater than a predetermined value, and the protein is greater than a predetermined value, calculating the raw score further comprises subtracting the point value of the positive factors.

10. The method of claim 8, further comprising rescaling the raw nutritional score to obtain the nutritional score associated with the particular one of the products offered by the business, the nutritional score having a value on a scale of 0 to 100, wherein 0 is characterized as least healthy and 100 is characterized as most healthy.

11. The method of claim 10, further comprising calculating an overall nutritional score for the list of the one or more products purchased by the registered customer.

12. The method of claim 10, further comprising the step of initiating, via the central computer server, an analysis of the nutritional score associated with the particular one of the products in order to classify the particular one of the products as having a high nutritional score, a moderate nutritional score, or a low nutritional score.

13. The method of claim 12, further comprising the step of initiating, via the central computer server, an analysis of an amount of the products having a high nutritional score, an amount of the products having a moderate nutritional score, and an amount of the products having a low nutritional score in order to identify and transmit to the registered customer, via the software application running on the mobile device, a percentage of products from the list of one or more products purchased by the user having high nutritional score, a moderate nutritional score, and a low nutritional score.

14. The method of claim 1, further comprising transmitting, via the central computer server, nutrition facts associated with the recommended product alternative.

15. A system for providing nutritional recommendations to a registered customer of a business, comprising:
- a central computer server;
- a database in communication with the central computer server, the database for storing data including nutritional scores associated with products offered by a business, and the database for storing lists of one or more products purchased by the registered customer; and
- a mobile device communicating with the central computer server via a software application running on the mobile device, the mobile device associated with the registered customer,
- wherein a list of one or more products purchased by the registered customer is received by the central computer server from the database and processed in order to assign a nutritional score from the database to each of the one or more products purchased by the registered customer,
- wherein the nutritional score of each of the one or more products purchased by the registered customer is compared by the central computer server with a nutritional score of one or more alternative products for each of the one or more products purchased by the registered customer, and
- wherein, based on the comparison of the nutritional score of each of the one or more products purchased by the registered customer with the nutritional score of the one or more alternative products, a recommended alternative product is selected from the one or more alternative products and is transmitted from the central computer server to the mobile device of the registered customer, the recommended alternative product having a nutritional score higher than the nutritional score of the corresponding one of the one or more products purchased by the registered customer, and the recommended alternative product alternative based on a purchase history of the registered customer stored in the database,
- wherein the recommended alternative product is displayed on the mobile device alongside an indicator to purchase the recommended alternative product,
- wherein upon a selection of the indicator to purchase the recommended alternative product via the software application running on the mobile device of the registered customer, the recommended alternative product is added, via the central computer server, to a future purchase list of the registered customer,
- wherein the nutritional scores associated with the products offered by the business are calculated by assigning a point value to a predetermined group of positive factors associated with a particular one of the products offered by the business and by assigning a point value to a predetermined group of negative factors associated with the particular one of the products offered by the business,
- wherein the positive factors are selected from the group consisting of: fruit, vegetable, nut, and whole grain content; protein content; and fiber content,
- wherein the negative factors are selected from the group consisting of: number of calories; amount of saturated fat; sodium content; and natural sugar content,
- wherein the positive factors further include a bonus point value corresponding to an amount of healthy fat in the particular one of the products offered by the business, and
- wherein the negative factors further include a penalty point value corresponding to an amount of added sugar in the particular one of the products offered by the business.

16. A method for providing nutritional recommendations to a registered customer of a business, comprising:
- compiling a database including nutritional scores associated with products offered by a business, the database managed by a central computer server;
- receiving, at the central computer server, a list of one or more products purchased by the registered customer;
- processing, via the central computer server, the list of one or more products purchased by the registered customer to assign a nutritional score from the database to each of the one or more products purchased by the registered customer;
- identifying a list of substitute products for each of the one or more products purchased by the registered customer, each substitute product having a level of interchangeability with a corresponding product of the one or more products purchased by the registered customer based on a purchase history of the registered customer stored in the database;
- removing from the list of substitute products those substitute products having a nutritional score less than the nutritional score of the corresponding product of the one or more products purchased by the registered customer;
- ranking the remaining list of substitute products using a weighted average of the nutritional score of each substitute product and the level of interchangeability of each substitute product to determine a recommended alternative product selected from the list of substitute products for the corresponding product of the one or more products purchased by the registered customer; and
- transmitting, via the central computer server, the recommended alternative product to a mobile device associated with the registered customer via a software application running on the mobile device;
- displaying on the mobile device, the recommended alternative product alongside an indicator to purchase the recommended alternative product;
- adding, via the central computer server, the recommended alternative product to a future purchase list of the registered customer in response to a selection of the indicator to purchase the recommended alternative product via the software application running on the mobile device of the registered customer,
- wherein the nutritional scores associated with the products offered by the business are calculated by assigning a point value to a predetermined group of positive factors associated with a particular one of the products offered by the business and by assigning a point value to a predetermined group of negative factors associated with the particular one of the products offered by the business,
- wherein the positive factors are selected from the group consisting of: fruit, vegetable, nut, and whole grain content; protein content; and fiber content,
- wherein the negative factors are selected from the group consisting of: number of calories; amount of saturated fat; sodium content; and natural sugar content, wherein the positive factors further include a bonus point value corresponding to an amount of healthy fat in the particular one of the products offered by the business, and wherein the negative factors further include a penalty point value corresponding to an amount of added sugar in the particular one of the products offered by the business.

17. The method of claim 16, wherein the level of interchangeability of each substitute product to the corresponding product of the one or more products purchased by the registered customer is determined by identifying other products that are typically purchased by the registered customer at the same time as the corresponding product of the one or more products and the frequency in which the substitute product is purchased by the registered customer with the other products instead of the corresponding product of the one or more products.

* * * * *